United States Patent
Holst

(10) Patent No.: US 10,054,701 B2
(45) Date of Patent: Aug. 21, 2018

(54) SEISMIC DATA RECORDER CHARGING AND DATA OFFLOAD

(71) Applicant: WESTERNGECO L.L.C., Houston, TX (US)

(72) Inventor: Einar Holst, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 259 days.

(21) Appl. No.: 14/489,193

(22) Filed: Sep. 17, 2014

(65) Prior Publication Data

US 2015/0089089 A1  Mar. 26, 2015

Related U.S. Application Data

(60) Provisional application No. 61/880,249, filed on Sep. 20, 2013.

(51) Int. Cl.
| | | |
|---|---|---|
| *G01V 1/24* | (2006.01) | |
| *G06F 1/18* | (2006.01) | |
| *G06F 13/12* | (2006.01) | |
| *G06F 13/28* | (2006.01) | |

(52) U.S. Cl.
CPC .............. *G01V 1/247* (2013.01); *G06F 1/183* (2013.01); *G06F 13/122* (2013.01); *G06F 13/28* (2013.01)

(58) Field of Classification Search
CPC .......... G01V 1/247; G01V 1/28; G06F 1/183; G06F 13/122; G06F 13/28; G06K 7/0008; G06K 19/0723
See application file for complete search history.

(56) References Cited

U.S. PATENT DOCUMENTS

| | | | | |
|---|---|---|---|---|
| 5,670,742 | A * | 9/1997 | Jones ................... | B64D 11/00 174/381 |
| 5,724,241 | A | 3/1998 | Wood et al. | |
| 6,024,344 | A | 2/2000 | Buckley et al. | |
| 2002/0106091 | A1* | 8/2002 | Furst ................... | H04R 19/04 381/91 |
| 2007/0091722 | A1 | 4/2007 | Karlsen | |
| 2007/0246497 | A1* | 10/2007 | Indeddi ................ | A45C 13/02 224/575 |
| 2008/0114548 | A1* | 5/2008 | Pavel ................... | G01V 1/223 702/14 |
| 2011/0292758 | A1 | 12/2011 | Fleure et al. | |
| 2012/0062175 | A1* | 3/2012 | Miller ................... | H02J 7/025 320/108 |
| 2013/0058192 | A1 | 3/2013 | Gateman et al. | |
| 2014/0060712 | A1* | 3/2014 | Beckley ............... | A45C 1/06 150/133 |

OTHER PUBLICATIONS

International search report and written opinion for the equivalent PCT patent application No. PCT/US2014/056194 dated Dec. 15, 2014.

* cited by examiner

*Primary Examiner* — An T Nguyen
(74) *Attorney, Agent, or Firm* — Kevin Brayton McGoff

(57) ABSTRACT

A system for storing seismic data recording units. The system may include a storage unit for storing the seismic data recording units. The system may also include a storage container disposed inside the storage unit. The storage container may define a volume of space in which the seismic data recording units are stored. The system may also include a cable coupled to one of the seismic data recording units. The cable may transfer seismic data from the one of the seismic data recording units to the storage unit.

16 Claims, 7 Drawing Sheets

SEISMIC DATA RECORDER CHARGING AND DATA OFFLOAD

CROSS-REFERENCE TO RELATED APPLICATION

This application claims the benefit of U.S. Provisional Patent Application Ser. No. 61/880,249, entitled, "SEISMIC DATA RECORDER CHARGING AND DATA OFFLOAD," filed Sep. 20, 2013, which is incorporated herein by reference in its entirety.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth along curved paths and refract and partially reflect off subsurface seismic reflectors (e.g., interfaces between subsurface layers). These propagating signals are recorded by sensors (e.g., receivers or geophones located in seismic data recording units) laid out in a seismic spread covering a region of the earth's surface. The recorded signals may then be processed to yield a seismic survey.

Accordingly, there is a need for methods and computing systems that can employ more effective and accurate methods for managing data that is collected during a seismic survey from a subsurface region or other multi-dimensional space.

SUMMARY

Described herein are implementations of various technologies for a system for storing seismic data recording units, which may include a storage unit for storing the seismic data recording units. The system may also include a storage container disposed inside the storage unit. The storage container may define a volume of space in which the seismic data recording units are stored. The system may also include a cable coupled to one of the seismic data recording units. The cable may transfer seismic data from the one of the seismic data recording units to the storage unit.

Described herein are implementations of various technologies for a system for storing seismic data recording units, which may include a storage unit for storing the seismic data recording units. The system may also include a storage container disposed inside the storage unit. The storage container may define a volume of space in which the seismic data recording units are stored. The system may also include an antenna coupled to the storage unit. The antenna may receive seismic data from the seismic data recording units.

Described herein are implementations of various technologies for a method, which may include positioning seismic data recording units inside a storage container. The method may also include moving the storage container inside the storage unit. The method may include connecting a cable from the storage unit to one of the seismic data recording units. The method may also include transferring data from the one of the seismic data recording units to the storage unit using the cable.

Described herein are implementations of various technologies for a method, which may include positioning seismic data recording units inside a storage container. The method may also include moving the storage container inside the storage unit. The method may also include transferring data from the seismic data recording units to the storage unit over a plurality of wireless connections using an antenna coupled to the storage unit.

The above referenced summary section is provided to introduce a selection of concepts that are further described below in the detailed description section. The summary is not intended to identify features of the claimed subject matter, nor is it intended to be used to limit the scope of the claimed subject matter. Furthermore, the claimed subject matter is not limited to implementations that solve any or most disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

DETAILED DESCRIPTION

Figure 1:
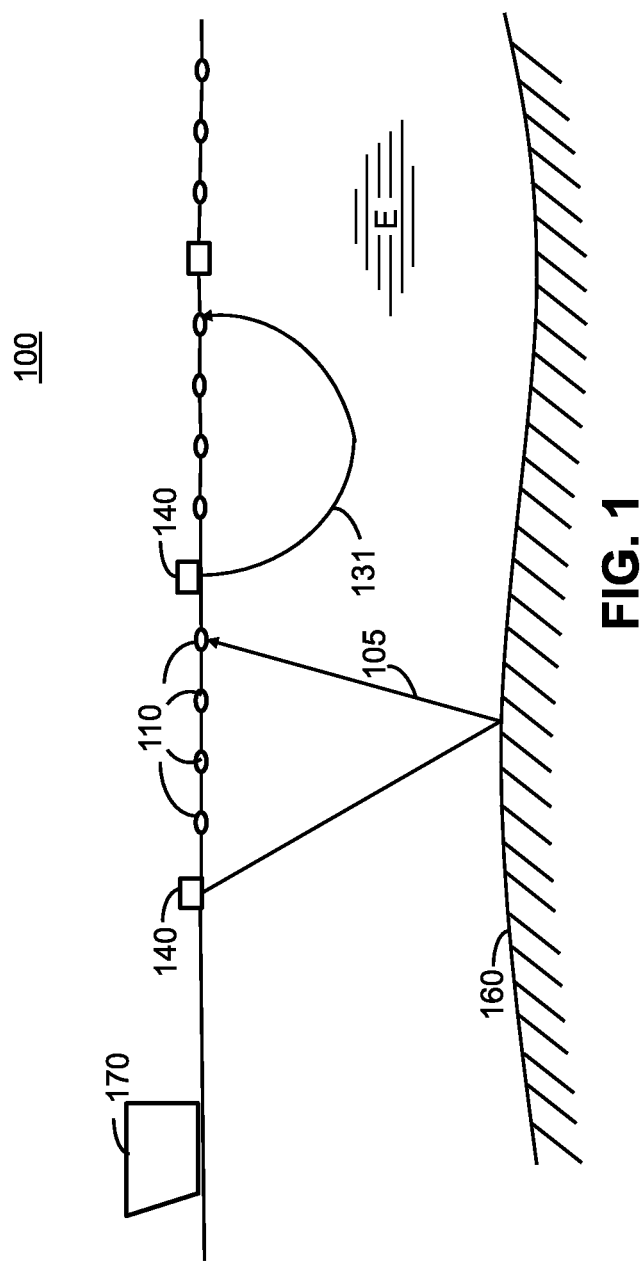
FIG. 1 illustrates a diagrammatic view of a land seismic acquisition system in accordance with various implementations described herein.

The discussion below is directed to certain specific implementations. It is to be understood that the discussion below is for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc., may be used herein to describe various elements, these elements should not be limited by these terms. These terms are used to distinguish one element from another. For example, a first object or block could be termed a second object or block, and, similarly, a second object or block could be termed a first object or block, without departing from the scope of the invention. The first object or block, and the second object or block, are both objects or blocks, respectively, but they are not to be considered the same object or block.

The terminology used in the description herein is for the purpose of describing particular implementations and is not intended to limit the claimed invention. As used herein, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Seismic survey or acquisition systems, especially on land, may include large cabled spreads of seismic sensors and associated equipment. Seismic sources may include land vibrators or dynamite charges to create a source impulse. In a cabled spread, power devices, recording devices, and sensor devices are connected by cables to detect the reflected signals and record seismic data. After recording, the seismic data may be transferred to a recording truck or offload station via the cables.

FIG. 1 illustrates a diagrammatic view of a land seismic acquisition system 100 in connection with implementations of various techniques described herein. The land seismic acquisition system 100 may include a data offload station 170, and a seismic spread 105 that includes a plurality of seismic sources 140 and a plurality of seismic data recording units 110 (also called "recording units"). The seismic sources 140 may include a single type of source, or different types. The seismic sources 140 may use any type of seismic generator, such as controllable seismic sources, explosive sources such as dynamite or gas injection followed by detonation and the like. The recording units 110 may be referred to as seismic nodes, which may be blind nodes or cabled nodes. Blind nodes may be recording devices placed over a region of interest that are not wired or cabled to the data offload station 170 or the rest of the seismic spread 105. As such, blind nodes may be passive recording devices that are collected after performing a seismic survey. The recording units 110 can be connected to one another or to a central recording or control unit by wireless connection. For more information regarding seismic nodes, see FIG. 2 below.

Keeping with FIG. 1, during acquisition, the seismic sources 140 may be deployed to encompass a region of interest. The seismic sources 140 may be periodically activated to emit seismic energy in the form of an acoustic or pressure wave through the earth E. The sources 140 may be activated individually or substantially simultaneously with other sources. The acoustic wave may result in one or more seismic wavefields that travel coherently into the earth E. As the wavefields strike interfaces 160 between earth formations, or strata, they may be reflected and/or refracted back through the earth E along paths 105 to the various recording units 110 where the wavefields (e.g., pressure waves in the case of air gun sources) may be converted to electrical signals, digitized and transmitted to the integrated computer-based source controller and recording system via the recording units 110. For instance, a refracting or diving wave path 131 is shown passing through the earth E from the sources 140 to the recording units 110. Through analysis of these detected signals, it may be possible to determine the shape, position and lithology of the sub-sea formations, including those formations that may include hydrocarbon deposits. While a land seismic survey is described in regard to FIG. 1, implementations of various techniques described herein may also be used in connection to a marine seismic survey.

After performing a seismic survey for a region of interest, the recording units 110 may be collected and taken to the data offload station 170. Recorded seismic data may be downloaded from the recording units 110 to the data offload station 170, while batteries in the recording units 110 are charging. As such, data offload and battery charging may be done in the field, where environmental conditions may be harsh (e.g., due to rain, heat, cold, sandstorms, wind, etc.).

Figure 2:
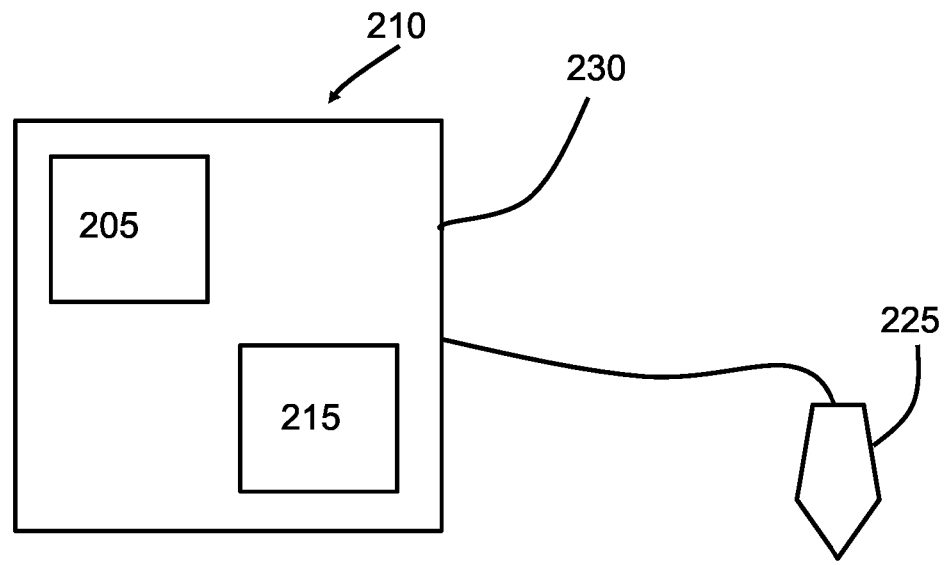
FIG. 2 illustrates a diagram of a seismic node in accordance with various implementations described herein.

FIG. 2 illustrates a diagram of a seismic node 210 (also called a "blind node") in connection with implementations of various techniques described herein. The seismic node 210 may include a housing 230 that contains a battery 205 and a memory 215. A sensor 225 may be coupled to the seismic node 210, for example, with a cable. For instance, the sensor 225 may be inside the seismic node 210 or outside the housing 230. In one implementation, the sensor 225 may be inside the housing 230, while another sensor may be connected outside the housing 230. The seismic node 210 may be one of the recording units 110 described in FIG. 1.

The sensor 225 may be a geophone, hydrophone or combination thereof, including a microelectromechanical systems (MEMS) geophone. The MEMS geophone may be a multicomponent sensor that records seismic data for one, two or three axes. As such, the axes may be orthogonal to one another. A rotation sensor or a tilt sensor may also be included with the sensor 225. A rotation sensor may include two or more MEMS accelerometers (at least two axis accelerometers), which may be spaced apart vertically along a support member.

After a seismic survey, the seismic node 210 may upload stored seismic data to the data offload station 170. For instance, the seismic node 210 may connect with the data offload station 170 using a plug, a cable, or wireless communications. The data offload station 170 may store the seismic data into memory, a data storage device, or transmit the data from the seismic node 210 to another location. Further, the battery 205 in the seismic node 210 may be charged using the same connection or port as used for the data offload. As such, charging a seismic node may be done simultaneously with offloading data, or charging and offloading data may be performed as consecutive operations.

The seismic node 210 may include wireless features. For instance, wireless communications may be used to offload data from the seismic node 210 or for quality control purposes, e.g., performing a system check regarding noise, clock operations and other performance issues regarding the seismic node 210.

Figure 3:
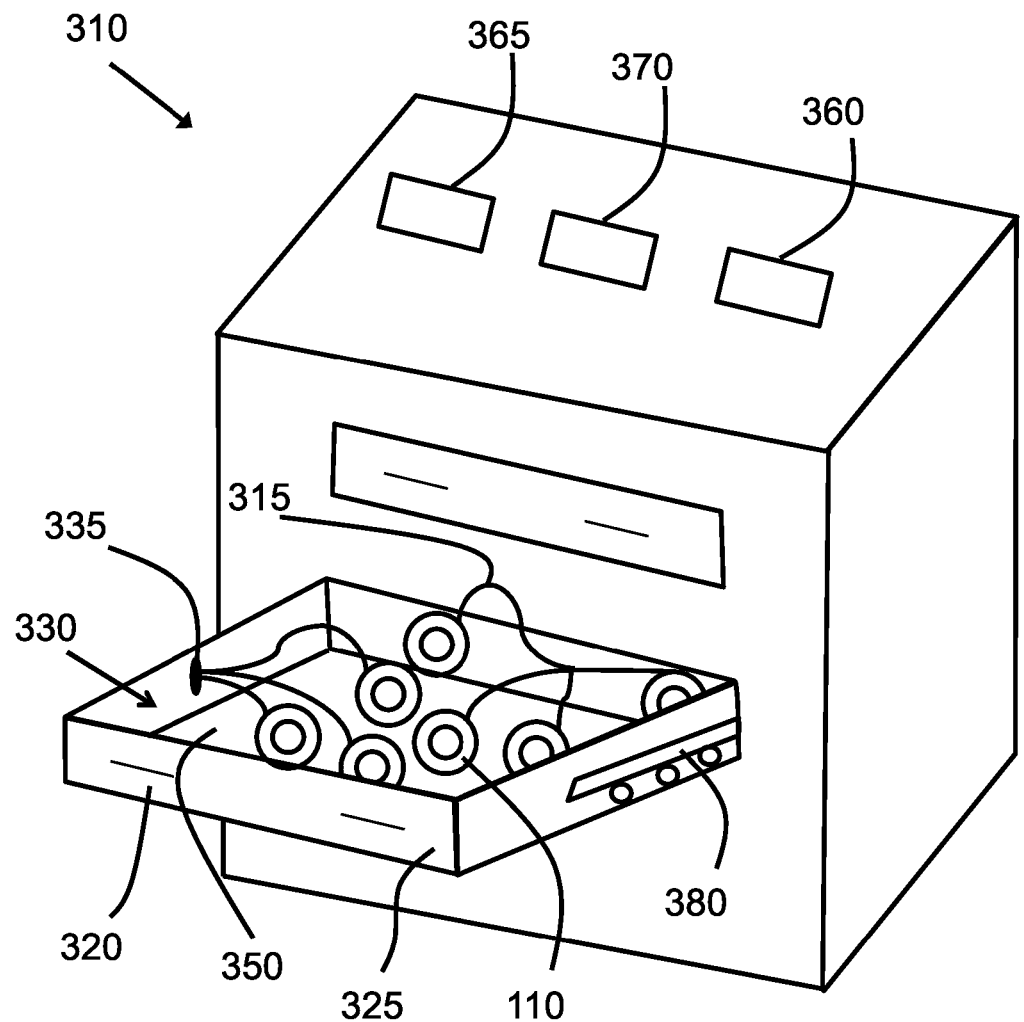
FIG. 3 illustrates a diagram of a storage unit in accordance with various implementations described herein.

FIG. 3 illustrates a diagram of a storage unit 310 in connection with implementations of various techniques described herein. The storage unit 310 may be the data offload station 170 from FIG. 1. For instance, the storage unit 310 may be used to offload data from the recording units 110 as well as to charge batteries inside the recording units 110. The storage unit 310 may include a support body configured to receive and support a storage container 320. For instance, the storage container 320 may be disposed at a predetermined position entirely or partially inside the storage unit 310 (e.g., the predetermined position may be a "closed position" where the storage container 320 is inserted into the storage unit 310). The storage container 320 may define a volume 330 of space (also called a "storage volume") that is at least partially surrounded by the storage container 320. The volume 330 may be used to store the recording units 110 after performing a seismic survey. The storage unit 310 may be weather proof when in the predetermined position so that damage to the storage unit 310 or the recording units 110 may be reduced if the storage unit 310 is transported in adverse conditions. In one implementation, the storage container 320 may be removable from the storage unit 310, and used to collect recording units 110 from the field, and then returned to the storage unit 310.

In another implementation, the storage container 320 may be a drawer configured for moving with respect to storage unit 310 (e.g., sliding in and out of the storage unit 310). As such, the drawer may include a guide device 380 (also called drawer glides or drawer slides). The guide device 380 may include sliding rails, wheels, bearings, or a combination thereof. The storage unit 310 may have one or more corresponding members configured to fit around the guide device 380.

The storage unit 310 may include a data storage device 360 (e.g., memory in the storage unit 310). The data storage device 360 may be a device located internal the storage unit 310, or be a removable device. For instance, the data storage device 360 may be the hard disk drive 850 or the storage device 835 described in FIG. 8. The storage unit 310 may also include a power source 365. The power source 365 may be located inside the storage unit 310, or be an external device to the storage unit 310. As such, the power source 365 may be a battery, a utility power source, a solar power generation station, or combinations thereof.

The storage unit 310 may also include a master controller 370 and associated devices to control data offload and charging operations for the recording units 110. For instance, the master controller 370 may be a computing system as described in FIG. 8 or other processor capable of controlling various operations for the storage unit 310. The master controller 370 may be located inside the storage unit 310, or be a remote device.

The storage container 320 may also include a base 350 for supporting the recording units 110 when disposed inside the storage container 320. The base 350 may be a solid flat planar surface, or the base 350 may include perforations, e.g., as a screen or mesh design. Where the storage container 320 is loaded with recording units obtained from the field (e.g., from a sandy environment), natural debris from the recording units 110 may find its way into the storage container 320. With a screen design, the base 350 may allow debris to fall through the base 350 while supporting the recording units 110. However, in other implementations, the base 350 may be solid to prevent debris from falling through the storage container 320 when disposed inside the storage unit 310.

A side support 325 may surround at least a portion of the base 350, thereby providing lateral containment to any recording units 110 that are supported on the base 350. In one implementation, the recording units 110 may be placed in the volume 330 in a random configuration. As such, different sizes and styles of seismic nodes or recording units may be stored in the storage container 320 for offloading data and charging. In other implementations, the storage container 320 may use slots or recessed seats specifically designed for individual nodes, where the slots may have a predetermined size or shape for a particular size or type of node (e.g., nodes with a particular shape may have a respective slot for them).

In some implementations, the dimensions of the storage container 320 may be such that the depth of the volume 330 may provide for space to store more than one recording unit deep. The depth of the volume 330 may extend from a frontal location of the storage unit 310 (e.g., where a user may access the recording units 110 in the storage container 320) to an interior location of the storage unit 310. In some implementations, the dimensions of the volume 330 may allow for three or four recording units to be placed between the back lateral support and the front lateral support of the storage container 320. Further, the width of the volume 330 may be as long as the depth of the storage container 320. In another implementation, the storage container 320 may provide space for at least three recording units by three recording units in a random configuration. In another implementation, the storage container 320 may fit four recording units by at least three recording units in a random configuration. In another implementation, recording units may be stacked on top of one another in a random configuration. The ability to place the recording units 110 into the volume 330 may allow the recording units 110 to arrange in favorable positions for use of space, e.g., as loading a series of balls into a container may result in the balls arranging in a pattern that properly utilized the overall space provided.

Furthermore, the storage unit 310 may include one or more cables 315 that are configured for coupling with the recording units 110. As such, the recording units 110 may use the cables 315 to communicate with the storage unit 310, offload data, receive power, or charge. On the storage unit 310, the cables 315 may electrically connect or couple with the data storage device 360, a master controller 370 or a power source 365. For more information regarding the cables 315, see FIG. 4 below.

In another implementation, the storage unit 310 may use wireless data offload for the recording units 110. For instance, an antenna may be disposed inside the storage container 320 to receive seismic data transmitted from the recording units 110. The recording units 110 may use WiFi, time division multiple access (TDMA), or any other applicable wireless communication protocol for the wireless data offload. In another implementation, one antenna may be used for the entire storage unit 310.

Keeping with wireless data offload, a faraday cage may be placed around the storage container 320 or the storage unit 310 to prevent interference from the recording units 110 while performing wireless data offload. For instance, the faraday cage may be an enclosure of conducting material that prevents at least a portion of the wireless signals from escaping the storage container 320 or the storage unit 310, i.e., by blocking static and non-static electric fields. As such, the faraday cage may be a solid or mesh barrier of conducting material disposed on the top, bottom and sides of the storage container 320. To produce the faraday cage, a thin layer (e.g., 0.1 to 2 mm) of aluminum or any other highly conductive material may be used for the enclosure.

In another implementation, respective faraday cages may be used to prevent wireless offload in one storage container (or storage unit) from interfering with wireless offload in a different storage container (or storage unit). For instance, a predetermined frequency band may be apportioned for the recording units 110 that are disposed inside a respective faraday cage. The recording units 110 may be assigned a specific frequency channel within the predetermined frequency band. If there are twenty recording units, for example, there may be twenty different frequency channels inside that respective faraday cage. The predetermined frequency band may be reused by the recording units 110 in other respective faraday cages without interference by recording units operating on the same frequency channels.

In another implementation, batteries on the recording units 110 may be charged using an inductive charger. For instance, an inductive power standard, such as the Qi standard, may be used to charge the recording units 110 without power cables. The inductive charger may be disposed on the bottom of the storage container 320 (e.g., in the base 350), and the recording units 110 may each have a respective induction coil that may be positioned on top of the inductive charger. Depending on the desired charging time for the recording units 110, the charging power of the inductive charger may be specified accordingly (e.g., 30 Watts).

Figure 4:
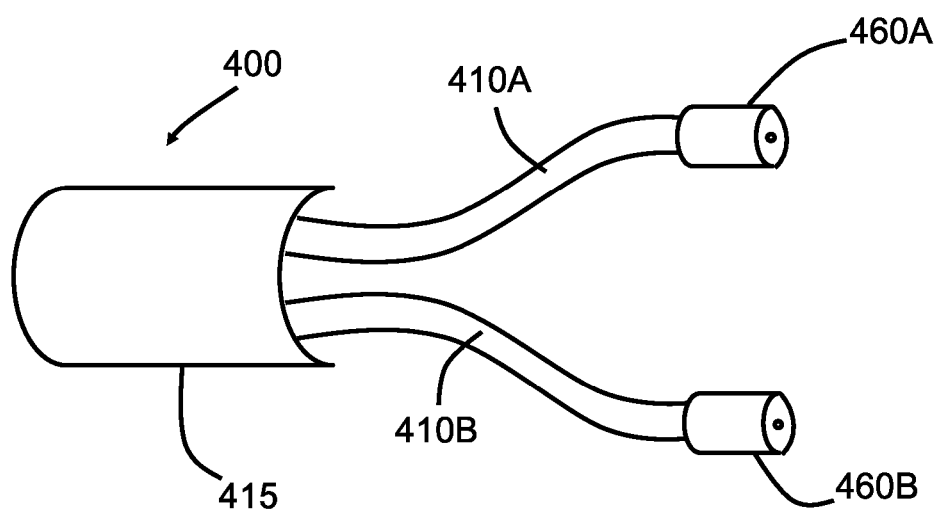
FIG. 4 illustrates a diagram of a cable in accordance with various implementations described herein.

FIG. 4 shows a diagram of a cable 400 in connection with implementations of various techniques described herein. The cable 400 may include a first cable 410A that is bound by an outer casing 415 (also called "outer wrap") with a second cable 410B. In one implementation, the first cable 410A may be used to transmit data from a recording unit to the storage unit 310, while the second cable 410B may be used to charge a battery on a respective recording unit. Connectors 460A-460B may be disposed at the end of the first and second cable 410A-410B, and used to connect with corresponding connectors of a corresponding recording unit. In another implementation, data and electric power for charging a battery may be transmitted on a single cable (e.g., the first cable 410A). For instance, the single cable may include separate wires inside the cable housing for transferring data and charging a battery.

Returning to FIG. 3, the cables 315 may connect to the storage container 320 at a common location 335 (e.g., a common position in the storage container 320). The cables 315 may have a predetermined length for reaching various locations of the recording units 110 positioned in the storage container 320. In one implementation, the cables 315 may have interchangeable connectors for use with any of the recording units 110. As such, there may not be a predefined arrangement of the recording units 110 inside the storage container 320.

In another implementation, contact connectors may be used with the storage container 320 and the storage unit 310. For instance, when the storage container 320 is placed inside the storage unit 310, the contact connectors may establish a connection for power transmission and data offload with the cables 315.

In another implementation, a contact connection (e.g., a plug connection) may be established between the storage container 320 and the storage unit 310, when the storage container 320 is moved to a closed position. For instance, the storage container 320 may move from a first position (e.g., open position) to a second position (e.g., a closed position) with respect to the storage unit 310 (i.e., where the storage container 320 is pushed into the storage unit 310). As such, in one implementation, a connection may occur when the storage container 320 closes (i.e., enters the closed position). In other implementations, the contact connection may be wireless (e.g., where the connection is over a short distance or short range gap).

In another implementation, the cables 315 may remain coupled with the storage unit 310 when the storage container 320 is removed from the storage unit 310. As such, once the storage container 320 is returned to the storage unit 310, the cables 315 may be reconnected to the recording units 110. As before, the cables 315 may originate and connect with the storage unit 310 at the common location 335. In other implementations, the cables 315 may originate from a plurality of locations in the storage container 320.

Figure 5:
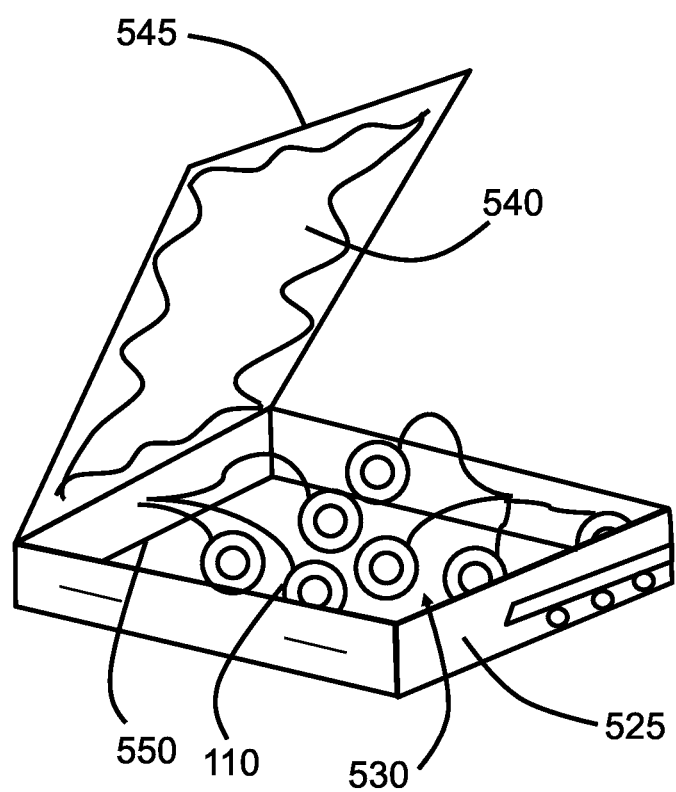
FIG. 5 illustrates a diagram of a storage container in accordance with various implementations described herein.

FIG. 5 illustrates a storage container 520 in connection with implementations of various techniques described herein. In FIG. 5, the storage container 520 may include a lid 545. The lid 545 may cover or enclose a portion or all of a volume 530 of space in the storage container 520. The lid 545 may couple to the storage container 520 through hinges or latched in place. The lid 545 may have a cushion component 540 disposed on the underside of the lid 545 that is directly opposite the volume 530. The cushion component 540 may include compressible and/or elastic material. As such, when the lid 545 is in place, the cushion component 540 may contact the recording units 110 to limit their movement inside the storage container 520. The cushion component 540 may include foam, rubber, an inflatable bag, a gel filled bag, a liquid filled bad, or combinations thereof. Further, a similar cushion component may be located on the base 550 and/or on the side support 525.

Figure 6:
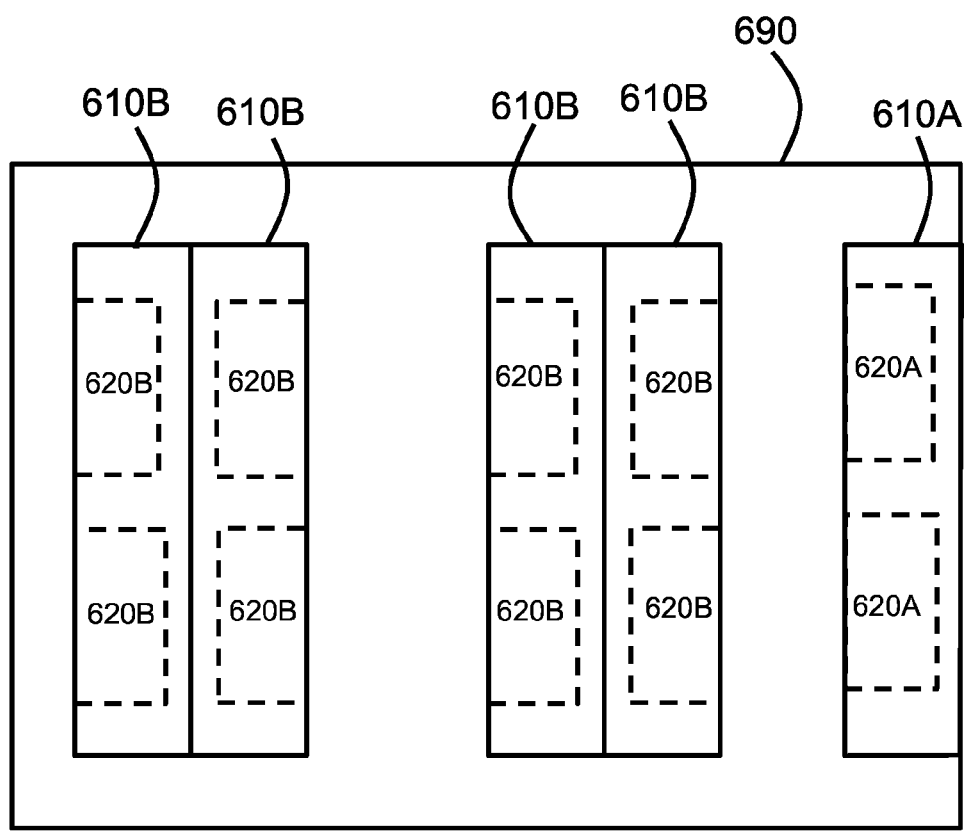
FIG. 6 illustrates a schematic of a mobile structure in accordance with various implementations described herein.

FIG. 6 illustrates a schematic of a mobile structure 690 in connection with implementations of various techniques described herein. As shown, the mobile structure 690 may include a plurality of storage units 610. When deployed in the field, adverse conditions can arise such as wind, temperatures, rain, and other severe environmental conditions. As such, the mobile structure 690 may provide shelter for one or more storage units 610. Using the mobile structure 690, shelter for the storage units 610 may be transported from one location to another location. In one implementation, the mobile structure 690 may be a container, such as a shipping container or other temporary structure. The mobile structure 690 may have a roof, as well as walls and a floor. The mobile structure 690 may have air conditioning and/or heating units incorporated therein, and may be insulated. The mobile structure 690 may include wheels or tracks. In another implementation, the mobile structure 690 may be carried on a mobile vehicle, e.g., a truck. In another implementation, the mobile structure 690 may be modular and configured for being taken apart, transported and re-assembled at a desired location. The mobile structure 690 may also be configured to be located on a marine vessel and employed with seabed nodes.

Furthermore, a single storage unit 610A is shown that includes two storage containers 620A. The storage unit 610A may be located at one end of the mobile structure 690. The side of the storage unit 610A that provides access to the storage containers 620A is facing away from the wall of the storage unit 610A. Located in the middle of the mobile structure 690 are sets of two storage units 610B that are positioned back to back. As such, the side with access to the storage containers 620B is facing out to provide access to a user.

Figure 7:
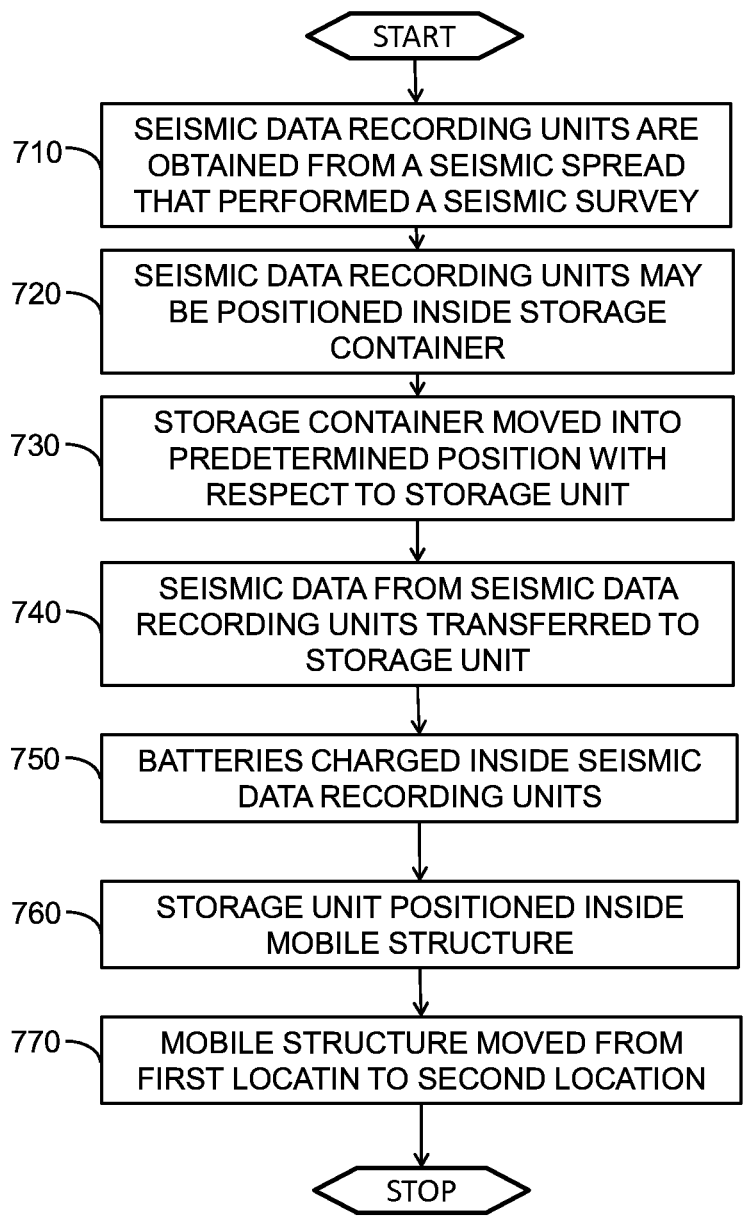
FIG. 7 illustrates a flow diagram of a method for processing seismic data from seismic data recording units in accordance with various implementations described herein.

FIG. 7 illustrates a flow diagram of a method for charging and downloading data from seismic data recording units in accordance with various implementations described herein. It should be understood that while the operational flow diagram indicates a particular order of execution of the operations, in other implementations, the operations might be executed in a different order. Further, in some implementations, additional operations or blocks may be added to the method. Likewise, some operations or blocks may be omitted.

At block 710, a plurality of seismic data recording units 110 may be obtained or retrieved from a seismic spread used in a seismic survey. For more information regarding performing a seismic survey, see FIG. 1 above.

At block 720, the recording units 110 may be positioned inside a storage container 320. For more information regarding storage containers, see FIGS. 3-5 above.

At block 730, the storage container 320 may be moved into a predetermined position with respect to a storage unit 310. The predetermined position may include the storage container 320 being disposed at least partially inside the storage unit 310. At block 720 or block 730, cables 315 from the storage unit 310 may be connected to the recording units 110. For more information regarding storage units, see FIG. 3 above.

At block 740, seismic data from the recording units 110 may be transferred to the storage unit 310. The data transfer may be performed using the cables 315 from block 730. In another implementation, the data may also be downloaded to the storage unit 310 over a plurality of wireless connections using an antenna.

At block 750, one or more batteries inside the recording units 110 may be charged using the storage unit 310. For instance, the batteries may be charged using the cables 315 from block 730. In another implementation, an inductive charger may be used to wirelessly charge the batteries on the recording units 110.

At block 760, the storage unit 310 may be positioned inside a mobile structure 690. For more information regarding mobile structures, see FIG. 6 above.

At block 770, the mobile structure 690 may be moved from a first location to a second location. For instance, the mobile structure 690 may be moved to a new survey site.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc., that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. The distributed computing environments may span multiple continents and multiple vessels, ships or boats. In a distributed computing environment, program modules may be located in both local and remote computer storage media including memory storage devices.

Figure 8:
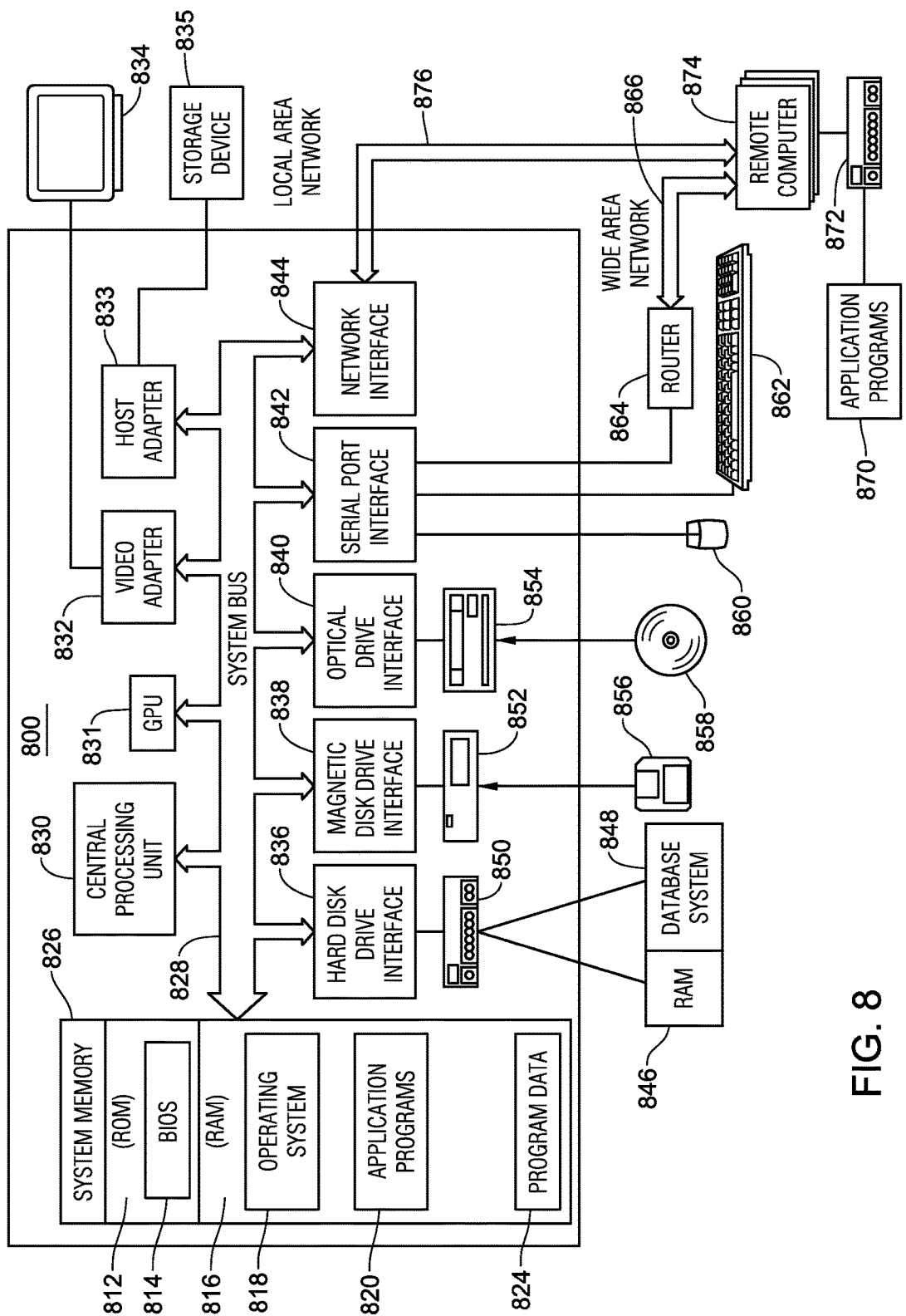
FIG. 8 illustrates a computing system in which the various technologies and techniques described herein may be incorporated and practiced.

FIG. 8 illustrates a schematic diagram of a computing system 800 in which the various technologies described herein may be incorporated and practiced. Although the computing system 800 may be a conventional desktop or a server computer, as described above, other computer system configurations may be used.

The computing system 800 may include a central processing unit (CPU) 830, a system memory 826, a graphics processing unit (GPU) 831 and a system bus 828 that couples various system components including the system memory 826 to the CPU 830. Although one CPU is illustrated in FIG. 8, it should be understood that in some implementations the computing system 800 may include more than one CPU. The GPU 831 may be a microprocessor specifically designed to manipulate and implement computer graphics. The CPU 830 may offload work to the GPU 831. The GPU 831 may have its own graphics memory, and/or may have access to a portion of the system memory 826. As with the CPU 830, the GPU 831 may include one or more processing units, and the processing units may include one or more cores. The system bus 828 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 826 may include a read-only memory (ROM) 812 and a random access memory (RAM) 816. A basic input/output system (BIOS) 814, containing the basic routines that help transfer information between elements within the computing system 800, such as during start-up, may be stored in the ROM 812.

The computing system 800 may further include a hard disk drive 850 for reading from and writing to a hard disk, a magnetic disk drive 852 for reading from and writing to a removable magnetic disk 856, and an optical disk drive 854 for reading from and writing to a removable optical disk 858, such as a CD ROM or other optical media. The hard disk drive 850, the magnetic disk drive 852, and the optical disk drive 854 may be connected to the system bus 828 by a hard disk drive interface 836, a magnetic disk drive interface 838, and an optical drive interface 840, respectively. The drives and their associated computer-readable media may provide nonvolatile storage of computer-readable instructions, data structures, program modules and other data for the computing system 800.

Although the computing system 800 is described herein as having a hard disk, a removable magnetic disk 856 and a removable optical disk 858, it should be appreciated by those skilled in the art that the computing system 800 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 800 may also include a host adapter 833 that connects to a storage device 835 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 850, magnetic disk 856, optical disk 858, ROM 812 or RAM 816, including an operating system 818, one or more application programs 820, program data 824, and a database system 848. The application programs 820 may include various mobile applications ("apps") and other applications configured to perform various methods and techniques described herein. The operating system 818 may be any suitable operating system that may control the operation of a networked personal or server computer, such as Windows® XP, Mac OS® X, Unix-variants (e.g., Linux® and BSD®), and the like.

A user may enter commands and information into the computing system 800 through input devices such as a keyboard 862 and pointing device 860. Other input devices may include a microphone, joystick, game pad, satellite dish, scanner, or the like. These and other input devices may be connected to the CPU 830 through a serial port interface 842 coupled to system bus 828, but may be connected by other interfaces, such as a parallel port, game port or a universal serial bus (USB). A monitor 838 or other type of display device may also be connected to system bus 828 via an interface, such as a video adapter 832. In addition to the monitor 838, the computing system 800 may further include other peripheral output devices such as speakers and printers.

Further, the computing system 800 may operate in a networked environment using logical connections to one or more remote computers 878. The logical connections may be any connection that is commonplace in offices, enterprise-wide computer networks, intranets, and the Internet, such as local area network (LAN) 876 and a wide area network (WAN) 866. The remote computers 874 may be another a computer, a server computer, a router, a network PC, a peer device or other common network node, and may include many of the elements describes above relative to the computing system 800. The remote computers 874 may also each include application programs 870 similar to that of the computer action function.

When using a LAN networking environment, the computing system 800 may be connected to the local network 876 through a network interface or adapter 844. When used in a WAN networking environment, the computing system 800 may include a router 864, wireless router or other means for establishing communication over a wide area network 866, such as the Internet. The router 864, which may be internal or external, may be connected to the system bus 828 via the serial port interface 842. In a networked environment, program modules depicted relative to the computing system 800, or portions thereof, may be stored in a remote memory storage device 835. It will be appreciated that the network connections shown are merely examples and other means of establishing a communications link between the computers may be used.

The network interface 844 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 874.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Those with skill in the art will appreciate that any of the listed architectures, features or standards discussed above with respect to the example computing system 400 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A system for storing a plurality of seismic data recording units, comprising:
   a storage unit for storing the plurality of seismic data recording units, wherein the storage unit is not a room;
   a storage container having a removable compartment configured to be disposed inside the storage unit, wherein the storage container defines a volume of space in which the plurality of seismic data recording units are stored;
   single antenna coupled to the storage unit, wherein the single antenna is configured to receive seismic data from the plurality of seismic data recording units, wherein the single antenna is disposed inside the storage container; and
   wherein the storage container comprises an enclosure of conducting material that is configured to prevent at least a portion of signals transmitted from the plurality of seismic data recording units from escaping the storage container.

2. The system of claim 1, further comprising a cable coupled to the storage unit, wherein the cable is configured to charge a battery on one of the plurality of seismic data recording units.

3. The system of claim 1, further comprising an inductive charger coupled to a bottom of the storage container, wherein the inductive charger is configured to charge a battery on at least one of the plurality of seismic data recording units.

4. The system of claim 1, wherein the enclosure of conducting material is disposed on the top, bottom and sides of the storage container and serves to provide a faraday cage.

5. The system of claim 4, wherein the faraday cage comprises a layer of highly conductive material.

6. The system of claim 5, wherein the highly conductive material comprises a layer of aluminum that is between 0.1 to 2.0 mm.

7. The system of claim 1, wherein the removable compartment is a drawer.

8. A method, comprising:
   positioning a plurality of seismic data recording units inside a storage container having a removable compartment;
   moving the storage container at least partially inside a storage unit, wherein the storage unit is not a room:
   transferring seismic data from the plurality of seismic data recording units to the storage unit over a plurality of wireless connections using at least one a single antenna coupled to the storage unit, wherein the single antenna is disposed inside the storage container; and
   wherein the storage container comprises an enclosure of conducting material that is configured to prevent at least a portion of the signals transmitted from the plurality of seismic data recording units from escaping the storage container.

9. The method of claim 8, wherein the plurality of seismic data recording units are positioned in a random configuration inside the storage container.

10. The method of claim 8, wherein the plurality of seismic data recording units were obtained from a seismic spread that performed a seismic survey.

11. The method of claim 8, further comprising charging a battery on at least one of the plurality of seismic data recording units by connecting the at least one of the plurality of seismic data recording units to a power source using a second cable.

12. The method of claim 8, further comprising using an inductive charger coupled to a bottom of the storage container to wirelessly charge a battery on at least one of the plurality of seismic data recording units.

13. The method of claim 8, wherein the enclosure of conducting material is disposed on the top, bottom and sides of the storage container and serves to provide a faraday cage.

14. The method of claim 13, wherein the faraday cage comprises a layer of highly conductive material.

15. The method of claim 14, wherein the highly conductive material comprises a layer of aluminum that is between 0.1 to 2.0 mm.

16. The method of claim 8, wherein the removable compartment is a drawer.

* * * * *